United States Patent
Rollinger et al.

(10) Patent No.: US 10,760,460 B1
(45) Date of Patent: Sep. 1, 2020

(54) METHOD AND SYSTEM FOR ENGINE OIL LEVEL SENSING

(71) Applicant: Ford Global Technologies, LLC, Dearborn, MI (US)

(72) Inventors: John Eric Rollinger, Troy, MI (US); Joshua Schumaker, Dearborn, MI (US); Karen Willard, Grosse Pointe Farms, MI (US); Allison Weir, Northville, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 16/439,445

(22) Filed: Jun. 12, 2019

(51) Int. Cl.
*F01M 11/12* (2006.01)
*G01F 23/24* (2006.01)
*B60K 6/24* (2007.10)

(52) U.S. Cl.
CPC .......... *F01M 11/12* (2013.01); *G01F 23/246* (2013.01); *B60K 6/24* (2013.01); *B60Y 2200/92* (2013.01); *F01M 2250/60* (2013.01); *F01M 2250/66* (2013.01)

(58) Field of Classification Search
CPC ............... F01M 11/12; F01M 2250/66; F01M 2250/60; G01F 23/246; B60Y 2200/92; B60K 6/24
See application file for complete search history.

(56) References Cited

U.S. PATENT DOCUMENTS

| 4,513,616 | A | 4/1985 | Bezard et al. | |
|---|---|---|---|---|
| 6,823,244 | B2 | 11/2004 | Breed | |
| 7,275,420 | B2 | 10/2007 | Discenzo | |
| 2002/0174712 | A1* | 11/2002 | Hubrich | F01M 11/10 73/54.01 |
| 2004/0122603 | A1* | 6/2004 | Guertler | F01M 1/06 702/55 |
| 2007/0056653 | A1 | 3/2007 | Schmidt et al. | |

FOREIGN PATENT DOCUMENTS

WO 2008047016 A1 4/2008

* cited by examiner

*Primary Examiner* — Hung Q Nguyen
(74) *Attorney, Agent, or Firm* — Geoffrey Brumbaugh; McCoy Russell LLP (57) ABSTRACT

Methods and systems are provided for improving engine oil level sensing while a vehicle is moving. The output of a hot wire sensor partially immersed in an engine oil well is sampled during selected vehicle moving conditions when lateral and longitudinal acceleration is limited and the vehicle is driving in a straight line. A transfer function is used to correlate a rate of change in sensor output, sampled during the selected vehicle operating conditions, with engine oil level.

20 Claims, 7 Drawing Sheets

METHOD AND SYSTEM FOR ENGINE OIL LEVEL SENSING

FIELD

The present description relates generally to methods and systems for dynamically measuring an engine oil level during vehicle operation.

BACKGROUND/SUMMARY

Engine oil is used to lubricate internal combustion engine components. The oil reduces friction and wear on moving parts, such as at piston rings, pistons rods, cylinder walls, crankcase, etc. Engine oil levels may be intermittently monitored, while a vehicle is stationary, to avert premature engine degradation. In particular, oil changes are prescribed when a sensed engine oil level falls below a threshold. The desire to increase the time period between engine oil changes, as well as the natural tendency of engines to burn engine oil and/or develop minor leaks has led to an increased importance in the monitoring of engine oil levels.

One example of an engine oil level sensor is shown by Bezard et al. in U.S. Pat. No. 4,513,616. Therein, a resistive wire probe (or "hot wire") is partially immersed in the liquid whose level is being sensed. Electrical energy is applied to the probe at different time points and a change in a measured electrical parameter of the probe is correlated with liquid level. Still other approaches include use an oil pressure sensor to infer engine oil level.

However, the inventors herein have recognized potential issues with such systems. As one example, by the time the pressure sensor infers that the oil level is below a threshold, the engine may already have experienced some level of irreversible degradation. As another example, the oil level measurement may require the vehicle to be stationary, as lateral and longitudinal acceleration experienced during vehicle motion can corrupt sensor outputs and generate false level readings. Thus if the oil level drops while the vehicle is in motion, the low oil level may not be detectable until the vehicle has come to a rest, by which time, the continued low engine oil level may have caused significant engine degradation. Furthermore, since engine oil is constantly being pumped throughout the engine, different pressures can result in different amounts of oil being trapped in the cylinder heads, which may not be easily detectable or differentiable.

In one example, the issues described above may be addressed by a method comprising sampling an oil level sensor at targeted time intervals during vehicle motion based at least on lateral and longitudinal vehicle acceleration; and estimating engine oil level based on the sampling. In this way, engine oil level may be sensed dynamically, while a vehicle is moving, allowing for an earlier and more reliable detection of low engine oil levels.

As one example, one or more existing vehicle sensors may be used to assess vehicle dynamic parameters. These include, for example, lateral vehicle acceleration, longitudinal vehicle acceleration, vehicle speed, engine speed, etc. As such, the vehicle dynamic parameters may be parameters that are already being assessed during vehicle operation for other considerations, such as for providing steering assist, or for adjusting suspension settings. Thresholds or ranges may be determined for each parameter and engine oil sampling criteria may be considered met when sampled vehicle data for each of the parameters is within their corresponding threshold or range. The thresholds and ranges may define vehicle moving conditions where engine oil level sensing can be reliably performed, such as during steady state vehicle operation in a substantially straight line. Each time the conditions are met, an oil level sensing may be performed by sending a current to a hot wire oil level sensor.

In this way, by relying of vehicle dynamics data that collected during vehicle operation, engine oil levels can be sampled more frequently. The technical effect of sampling the engine oil level only when selected vehicle dynamics criteria are met is that hot wire oil sensor data can be captured more accurately during vehicle motion. Overall, the robustness and reliability of oil level sensing is improved. By measuring engine oil levels frequently during vehicle operation, an oil leak can be captured earlier in a drive cycle (such as before it can be sensed by a pressure sensor), allowing for earlier addressing of the low oil level. For example, engine oil can be topped off earlier. Alternatively, a potential leak can be identified earlier and service scheduled in accordance.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

DETAILED DESCRIPTION

Figure 5:
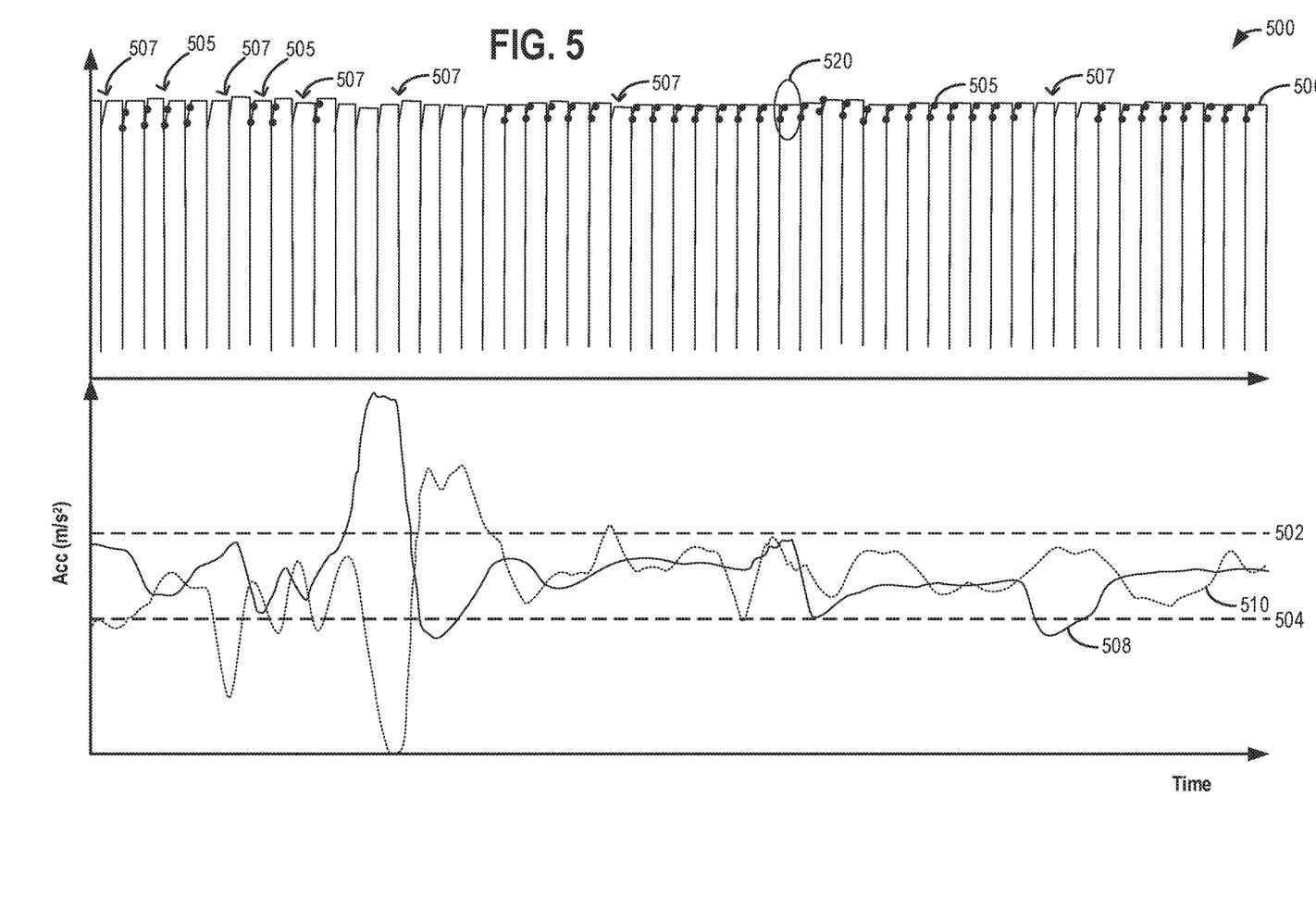
FIG. 5 shows an example of sampling engine oil level while a vehicle is traveling.
Figure 6:
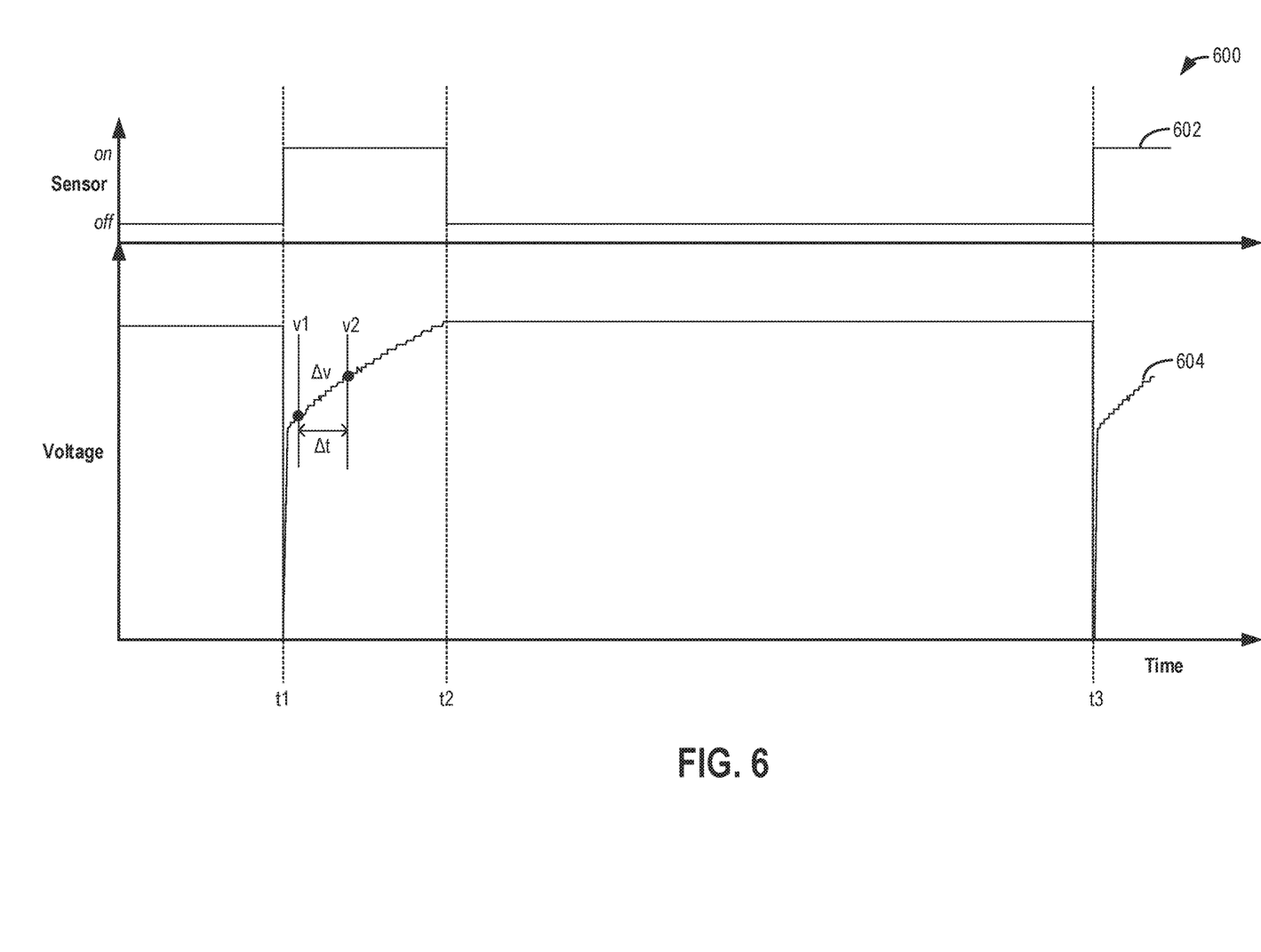
FIG. 6 shows an example of engine oil level sensing while a vehicle is traveling.
Figure 7:
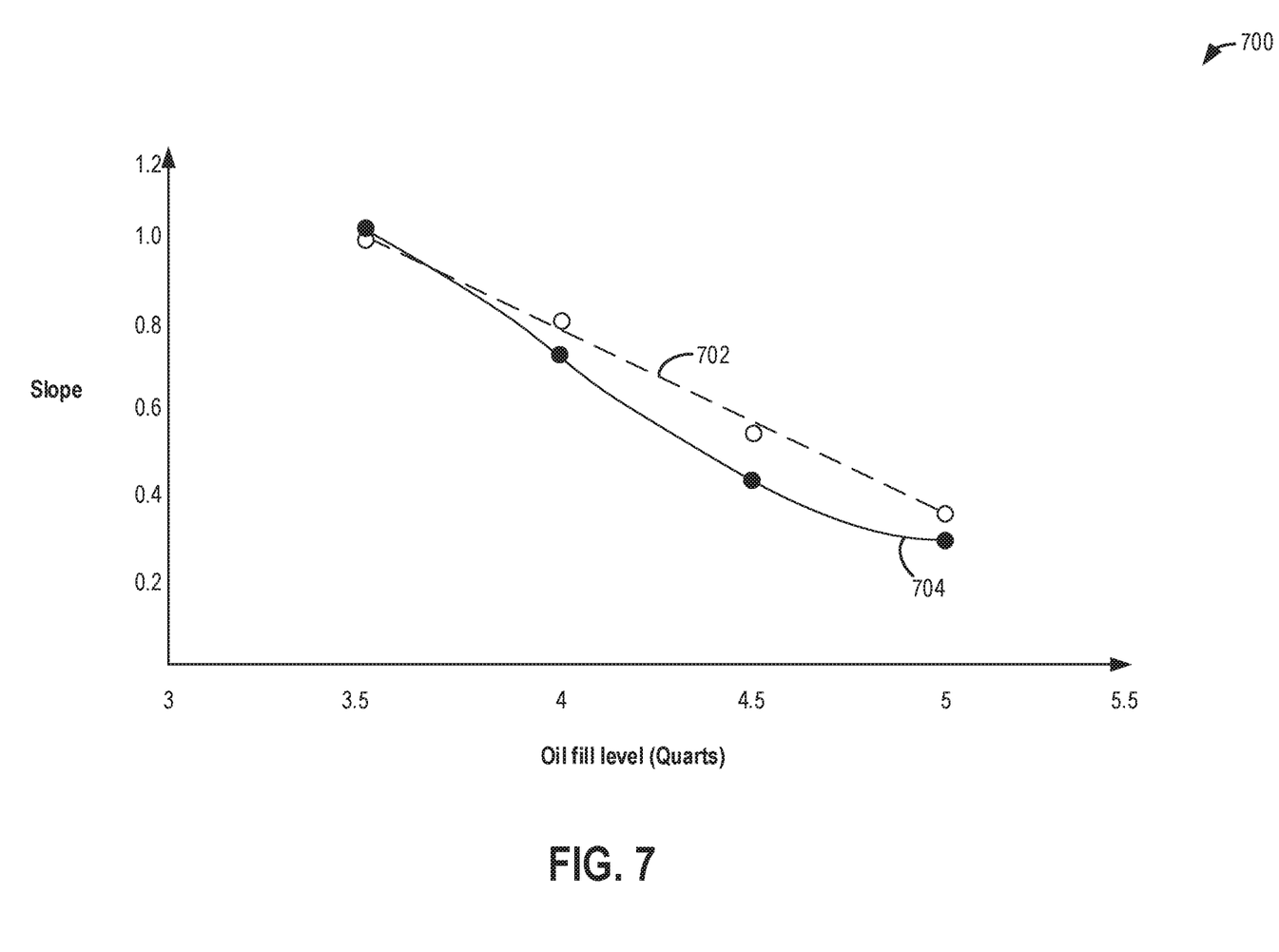
FIG. 7 shows example transfer functions that may be used to correlate a hot wire sensor output with engine oil level.

The following description relates to systems and methods for estimating an oil level in an engine system while a vehicle is traveling. Engine oil level may be estimated for the engine system of FIG. 2, coupled in the vehicle system of FIG. 1. Engine oil level sensing may be achieved via a resistive wire probe coupled to an electrical power source, such as via the circuit of FIG. 3. An engine controller may be configured to perform a control routine, such as the example routine of FIG. 4, to sense engine oil levels when data pertaining to vehicle dynamics fulfil selected criteria. Vehicle dynamics may be learned via vehicle lateral and longitudinal acceleration, as well as engine speed and vehicle speed. An example scenario of real-time engine oil level assessment during vehicle motion is shown at FIGS. 5-6. Example transfer functions used to correlate sensor output with oil levels are shown at FIG. 7.

Figure 1:
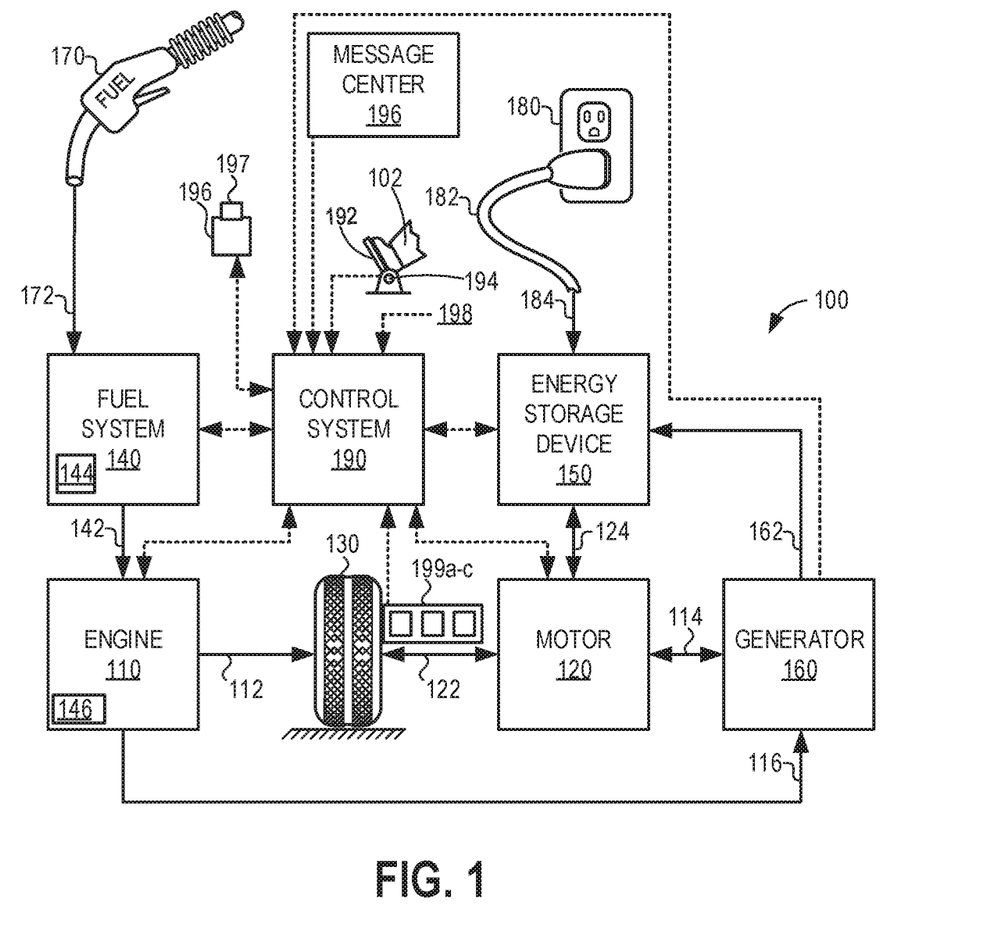
FIG. 1 shows an example hybrid electric vehicle propulsion system.

FIG. 1 illustrates an example vehicle propulsion system 100. Vehicle propulsion system 100 includes a fuel burning engine 110 and a motor 120. As a non-limiting example, engine 110 comprises an internal combustion engine and motor 120 comprises an electric motor. Motor 120 may be configured to utilize or consume a different energy source than engine 110. For example, engine 110 may consume a liquid fuel (e.g., gasoline) to produce an engine output while motor 120 may consume electrical energy to produce a motor output. As such, a vehicle with propulsion system 100 may be referred to as a hybrid electric vehicle (HEV).

Vehicle propulsion system 100 may utilize a variety of different operational modes depending on operating conditions encountered by the vehicle propulsion system. Some of these modes may enable engine 110 to be maintained in an off state (i.e. set to a deactivated state) where combustion of fuel at the engine is discontinued. For example, under select operating conditions, motor 120 may propel the vehicle via drive wheel 130 as indicated by arrow 122 while engine 110 is deactivated.

During other operating conditions, engine 110 may be set to a deactivated state (as described above) while motor 120 may be operated to charge energy storage device 150. For example, motor 120 may receive wheel torque from drive wheel 130 as indicated by arrow 122 where the motor may convert the kinetic energy of the vehicle to electrical energy for storage at energy storage device 150 as indicated by arrow 124. This operation may be referred to as regenerative braking of the vehicle. Thus, motor 120 can provide a generator function in some embodiments. However, in other embodiments, generator 160 may instead receive wheel torque from drive wheel 130, where the generator may convert the kinetic energy of the vehicle to electrical energy for storage at energy storage device 150 as indicated by arrow 162.

During still other operating conditions, engine 110 may be operated by combusting fuel received from fuel system 140 as indicated by arrow 142. For example, engine 110 may be operated to propel the vehicle via drive wheel 130 as indicated by arrow 112 while motor 120 is deactivated. During other operating conditions, both engine 110 and motor 120 may each be operated to propel the vehicle via drive wheel 130 as indicated by arrows 112 and 122, respectively. A configuration where both the engine and the motor may selectively propel the vehicle may be referred to as a parallel type vehicle propulsion system. Note that in some embodiments, motor 120 may propel the vehicle via a first set of drive wheels and engine 110 may propel the vehicle via a second set of drive wheels.

In other embodiments, vehicle propulsion system 100 may be configured as a series type vehicle propulsion system, whereby the engine does not directly propel the drive wheels. Rather, engine 110 may be operated to power motor 120, which may in turn propel the vehicle via drive wheel 130 as indicated by arrow 122. For example, during select operating conditions, engine 110 may drive generator 160, which may in turn supply electrical energy to one or more of motor 120 as indicated by arrow 114 or energy storage device 150 as indicated by arrow 162. As another example, engine 110 may be operated to drive motor 120 which may in turn provide a generator function to convert the engine output to electrical energy, where the electrical energy may be stored at energy storage device 150 for later use by the motor.

Fuel system 140 may include one or more fuel storage tanks 144 for storing fuel on-board the vehicle. For example, fuel tank 144 may store one or more liquid fuels, including but not limited to: gasoline, diesel, and alcohol fuels. In some examples, the fuel may be stored on-board the vehicle as a blend of two or more different fuels. For example, fuel tank 144 may be configured to store a blend of gasoline and ethanol (e.g., E10, E85, etc.) or a blend of gasoline and methanol (e.g., M10, M85, etc.), whereby these fuels or fuel blends may be delivered to engine 110 as indicated by arrow 142. Still other suitable fuels or fuel blends may be supplied to engine 110, where they may be combusted at the engine to produce an engine output. The engine output may be utilized to propel the vehicle as indicated by arrow 112 or to recharge energy storage device 150 via motor 120 or generator 160.

In some embodiments, energy storage device 150 may be configured to store electrical energy that may be supplied to other electrical loads residing on-board the vehicle (other than the motor), including cabin heating and air conditioning, engine starting, headlights, cabin audio and video systems, etc. As a non-limiting example, energy storage device 150 may include one or more batteries and/or capacitors.

Control system 190 may communicate with one or more of engine 110, motor 120, fuel system 140, energy storage device 150, and generator 160. Control system 190 may receive sensory feedback information from one or more of engine 110, motor 120, fuel system 140, energy storage device 150, and generator 160. Further, control system 190 may send control signals to one or more of engine 110, motor 120, fuel system 140, energy storage device 150, and generator 160 responsive to this sensory feedback. Control system 190 may receive an indication of an operator requested output of the vehicle propulsion system from a vehicle operator 102. For example, control system 190 may receive sensory feedback from pedal position sensor 194 which communicates with pedal 192. Pedal 192 may refer schematically to a brake pedal and/or an accelerator pedal.

Energy storage device 150 may periodically receive electrical energy from a power source 180 residing external to the vehicle (e.g., not part of the vehicle) as indicated by arrow 184. As a non-limiting example, vehicle propulsion system 100 may be configured as a plug-in hybrid electric vehicle (HEV), whereby electrical energy may be supplied to energy storage device 150 from power source 180 via an electrical energy transmission cable 182. During a recharging operation of energy storage device 150 from power source 180, electrical transmission cable 182 may electrically couple energy storage device 150 and power source 180. While the vehicle propulsion system is operated to propel the vehicle, electrical transmission cable 182 may disconnected between power source 180 and energy storage device 150. Control system 190 may identify and/or control the amount of electrical energy stored at the energy storage device, which may be referred to as the state of charge (SOC).

In other embodiments, electrical transmission cable 182 may be omitted, where electrical energy may be received wirelessly at energy storage device 150 from power source 180. For example, energy storage device 150 may receive electrical energy from power source 180 via one or more of electromagnetic induction, radio waves, and electromagnetic resonance. As such, it should be appreciated that any suitable approach may be used for recharging energy storage device 150 from a power source that does not comprise part of the vehicle, such as from solar or wind energy. In this way, motor 120 may propel the vehicle by utilizing an energy source other than the fuel utilized by engine 110.

Fuel system 140 may periodically receive fuel from a fuel source residing external to the vehicle. As a non-limiting example, vehicle propulsion system 100 may be refueled by receiving fuel via a fuel dispensing device 170 as indicated by arrow 172. In some embodiments, fuel tank 144 may be configured to store the fuel received from fuel dispensing device 170 until it is supplied to engine 110 for combustion. In some embodiments, control system 190 may receive an indication of the level of fuel stored at fuel tank 144 via a fuel level sensor. The level of fuel stored at fuel tank 144 (e.g., as identified by the fuel level sensor) may be communicated to the vehicle operator, for example, via a fuel gauge or indication in a vehicle instrument panel 196.

The vehicle propulsion system 100 may also include an ambient temperature/humidity sensor 198. Further, one or more sensors pertaining to vehicle dynamics may be included such as sensors for estimating vehicle longitudinal and lateral acceleration. These may include a roll stability control sensor, lateral acceleration sensor 199a, longitudinal acceleration sensor 199b, and yaw rate sensor 199c. The vehicle instrument panel 196 may include indicator light(s) and/or a text-based display in which messages are displayed to an operator. For example, a low oil level indicator light may be included in the instrument panel. The vehicle instrument panel 196 may also include various input portions for receiving an operator input, such as buttons, touch screens, voice input/recognition, etc. For example, the vehicle instrument panel 196 may include a refueling button 197 which may be manually actuated or pressed by a vehicle operator to initiate refueling.

In an alternative embodiment, the vehicle instrument panel 196 may communicate audio messages to the operator without display. Further, the sensor(s) 199 may include a vertical accelerometer to indicate road roughness. These devices may be connected to control system 190. In one example, the control system may adjust engine output and/or the wheel brakes to increase vehicle stability in response to sensor(s) 199.

Engine 110 may also house oil for lubrication of engine moving parts, such as for lubricating pistons rods and rings, in an oil well. An oil level in the oil well of the engine may be estimated by oil level sensor 146. As elaborated with reference to FIGS. 2-3, the oil level sensor may be a resistive probe (also referred to as a hot wire sensor or electrothermic sensor) which is partially immersed in the oil. The sensor may be operated by passing a current there-through, via an associated electrical circuit (shown at FIG. 3), and measuring an electrical parameter (e.g., voltage or temperature). By applying a current at distinct time points and measuring the corresponding electrical parameter values, a change in the electrical parameter may be correlated with the oil level. Application of an electric current to the electrothermic oil level sensor cases the wire element of the sensor to heat up. The temperature of the wire creates a different resistance across the circuit resulting in a different measured voltage. The amount of the wire element submerged in oil causes a different rate of heating which manifests itself in the differences in voltage slope at different oil levels.

Figure 2:
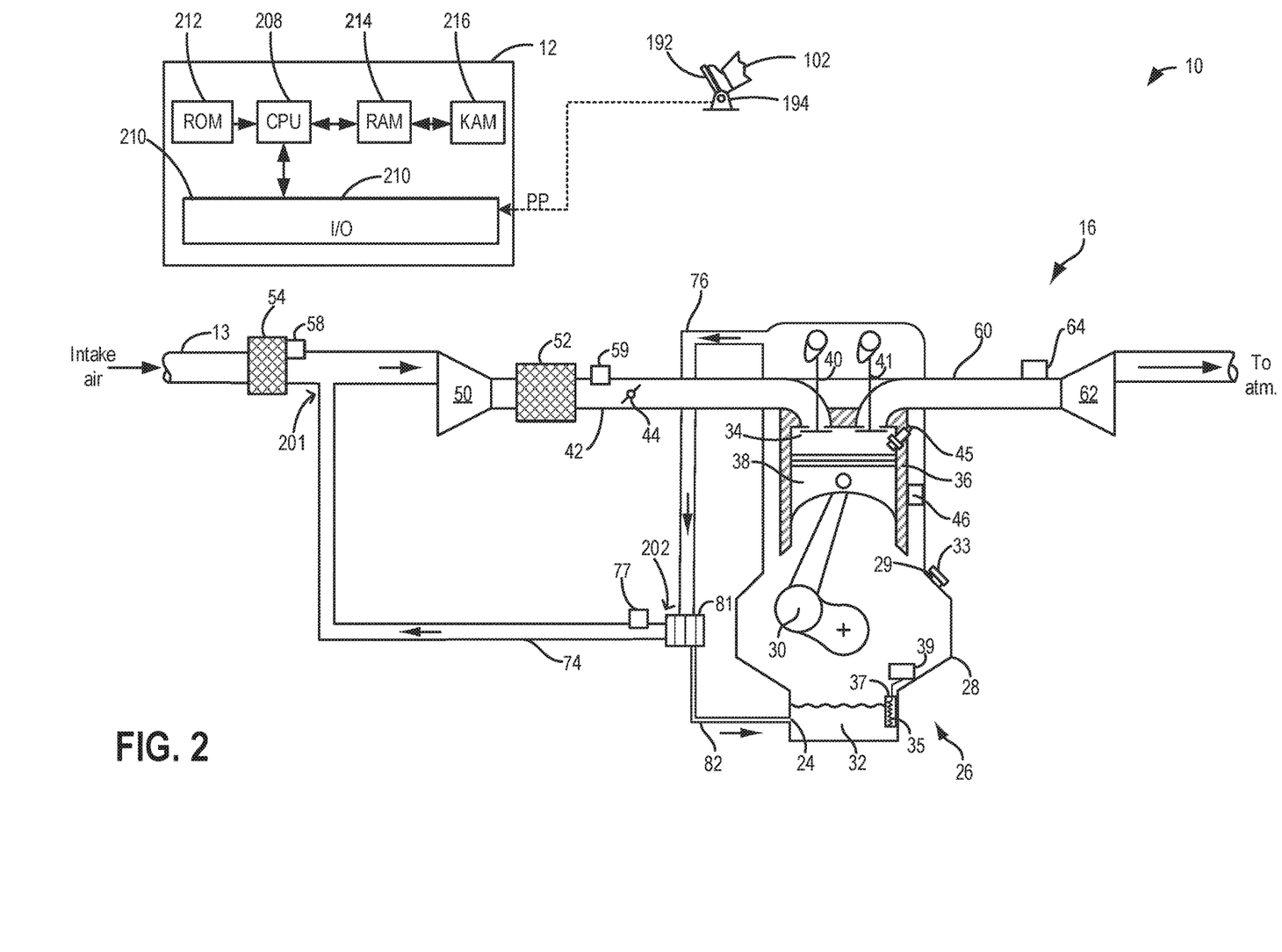
FIG. 2 shows a partial engine view in accordance with the disclosure.

Referring now to FIG. 2, it shows an example system configuration of a multi-cylinder internal combustion engine, generally depicted at 10, which may be included in a propulsion system of an automotive vehicle. In one example, engine 10 includes engine 110 of FIG. 1 in vehicle system 100 of FIG. 1.

Engine 10 may be controlled at least partially by a control system including controller 12 and by input from a vehicle operator 102 via an input device 192. In this example, input device 192 includes an accelerator pedal or a brake pedal and a pedal position sensor 144 for generating a proportional pedal position signal PP.

Figure 3:
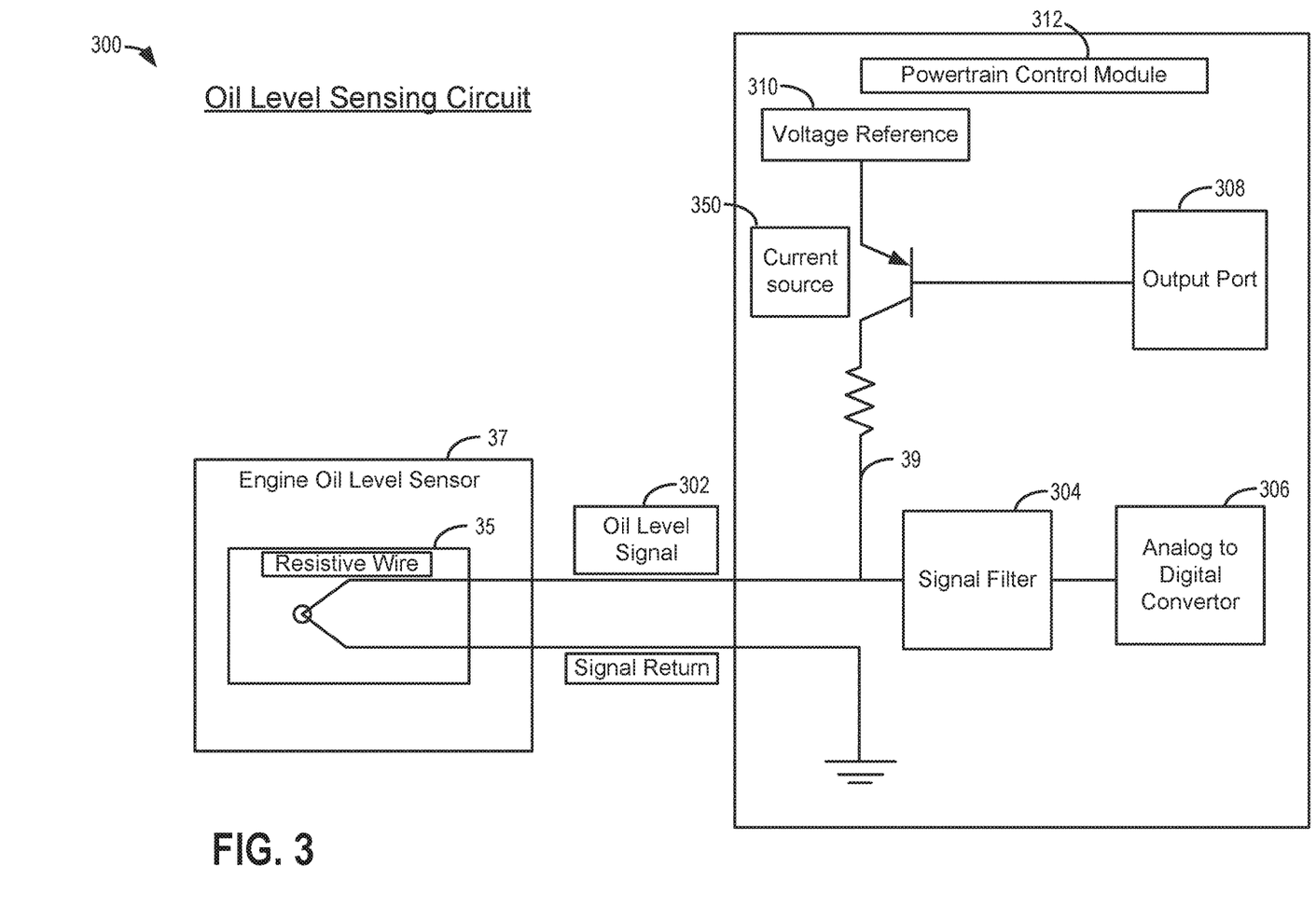
FIG. 3 shows an example hot wire circuit for engine oil level sensing.

Engine 10 may include a lower portion of the engine block, indicated generally at 26, which may include a crankcase 28 encasing a crankshaft 30 with oil well 32 positioned below the crankshaft. An oil fill port 29 may be disposed in crankcase 28 so that oil may be supplied to oil well 32. In one example, oil may be intermittently supplied responsive to a drop in the level of oil in the oil well. Since the oil lubricates the moving parts of the engine, insufficient oil may result in increased friction and abrasive wear, leading to premature engine degradation. Oil fill port 29 may include an oil cap 33 to seal oil port 29 when the engine is in operation. An oil level sensor 37 may also be disposed in crankcase 28 and may include a resistive wire 35 coupled to an electrical circuit 39 for probing a level of oil in oil well 32. The electrical circuit may receive electrical power from a battery, such as a dedicated battery, or a system battery (such as energy storage device 150 of FIG. 1). A detailed embodiment of the electrical circuit is shown at FIG. 3. In particular, when oil level sensing conditions are met, controller 12 may apply a current to the resistive wire probe via the electrical circuit. Another current may be applied after a defined delay. The voltage is then measured. By correlating a change in the measured electrical parameter, herein voltage, at the two samples, the voltage slope can be calculated between the two points and can be correlated with engine oil level. For example, the two voltage readings can be used to calculate a slope that corresponds to the wire of the resistive probe heating up. The slope is then correlated with the amount of oil in the oil well.

An opening 24 in crankcase 28 may return oil, separated from blow-by gases at oil separator 81, to oil well 32 via oil return passage 82. In addition, crankcase 28 may include a plurality of other orifices for servicing components in crankcase 28. These orifices in crankcase 28 may be maintained closed during engine operation so that a crankcase ventilation system (described below) may operate during engine operation.

The upper portion of engine block 26 may include a combustion chamber (i.e., cylinder) 34. The combustion chamber 34 may include combustion chamber walls 36 with piston 38 positioned therein. Piston 38 may be coupled to crankshaft 30 so that reciprocating motion of the piston is translated into rotational motion of the crankshaft. Combustion chamber 34 may receive fuel from fuel injector 45 (configured herein as a direct fuel injector) and intake air from intake manifold 42 which is positioned downstream of throttle 44. The engine block 26 may also include an engine coolant temperature (ECT) sensor 46 input into an engine controller 12 (described in more detail below herein).

A throttle 44 may be disposed in the engine intake to control the airflow entering intake manifold 42 and may be preceded upstream by compressor 50 followed by charge air cooler 52, for example. An air filter 54 may be positioned upstream of compressor 50 and may filter fresh air entering intake passage 13. The intake air may enter combustion chamber 34 via cam-actuated intake valve system 40. Likewise, combusted exhaust gas may exit combustion chamber 34 via cam-actuated exhaust valve system 41. In an alternate embodiment, one or more of the intake valve system and the exhaust valve system may be electrically actuated.

Exhaust combustion gases exit the combustion chamber 34 via exhaust passage 60 located upstream of turbine 62. An exhaust gas sensor 64 may be disposed along exhaust passage 60 upstream of turbine 62. Turbine 62 may be equipped with a waste-gate (not shown) bypassing it. Sensor 64 may be a suitable sensor for providing an indication of exhaust gas air/fuel ratio such as a linear oxygen sensor or UEGO (universal or wide-range exhaust gas oxygen), a two-state oxygen sensor or EGO, a HEGO (heated EGO), a NOx, HC, or CO sensor. Exhaust gas sensor 64 may be connected with controller 12.

In the example of FIG. 2, a crankcase ventilation (CV) system 16 is coupled to the engine intake so that blow-by gases in the crankcase (which consists of a mixture of air, unburned fuel, and combustion gases) may be vented in a controlled manner from the crankcase. The blow-by gas at the crankcase is introduced into the intake passage 42, downstream of MAF sensor 58 and air filter 54, via breather or crankcase vent tube (CVT) 74. In particular, blow-by gases are first directed to oil separator 81 along ventilation passage 76. Oil is separated from the blow-by gas and returned to oil well 32 via oil return passage 82 while blow-by gases cleaned of oil are directed to the engine intake via vent tube 74.

A first side 201 of crankcase vent tube 74 may be mechanically coupled, or connected, to fresh air intake passage 13 upstream of compressor 50. In some examples, the first side 201 of crankcase ventilation tube 74 may be coupled to intake passage 13 downstream of air cleaner 54 (as shown). A second, opposite side 202 of crankcase ventilation tube 74 may be designed to be permanently coupled to the oil separator. Crankcase vent tube 74 further includes a pressure sensor 77, the pressure sensor herein also referred as CV (Crankcase Ventilation) pressure sensor, coupled therein for providing an estimate about the pressure of air flowing through crankcase vent tube 74. CV Pressure sensor 77 may be an absolute pressure sensor or a gauge sensor. In an alternate embodiment, CV pressure sensor 77 may be a flow sensor or flow meter. In still another embodiment, sensor 77 may be configured as a venturi. It will be understood that the CV system 16 may also include a conduit providing fluidic communication between the intake manifold 42, downstream of the throttle 44, and the crankcase 28. As such, the CV system may, in some examples, vent crankcase gas to the intake system during boosted and/or non-boosted conditions. To accomplish said crankcase ventilation, the system may include valves, flow restrictors, etc., positioned in the vent tube 74 and/or conduit extending between the crankcase and the intake manifold.

Controller 12 is shown in FIG. 2 as a microcomputer, including microprocessor unit 208, input/output ports 210, an electronic storage medium for executable programs and calibration values shown as read only memory chip 212 in this particular example, random access memory 214, keep alive memory 216, and a data bus. Controller 12 may receive various signals from sensors coupled to engine 10, including measurement of inducted mass air flow (MAF) from mass air flow sensor 58; engine coolant temperature (ECT) from temperature sensor 46; exhaust gas air/fuel ratio from exhaust gas sensor 64; crankcase vent tube pressure sensor 77, BP sensor 57, TIP sensor 59, and oil level from oil level sensor 37, etc. Furthermore, controller 12 may monitor and adjust the position of various actuators based on input received from the various sensors. These actuators may include, for example, throttle 44, intake and exhaust valve systems 40, 41. Storage medium read-only memory 212 can be programmed with computer readable data representing instructions executable by processor 208 for performing the methods described below, as well as other variants that are anticipated but not specifically listed. Example methods and routines are described herein with reference to FIG. 4. For example, responsive to output of lateral and longitudinal acceleration sensors of the vehicle (sensors 199a-c of FIG. 1) being indicative of steady state vehicle operation in substantially a straight line, the controller may apply a current to the resistive wire probe of the oil level sensor and infer an engine oil level.

Turning now to FIG. 3, an example circuit 300 is shown for applying a current to a resistive wire probe of an oil level sensor. By measuring an electrical output, via components of the circuit, an engine oil level may be inferred. Circuit 300 may be representative of circuit 39 of FIG. 2.

Circuit 300 shows engine oil level sensor 37 (described earlier in FIG. 2) including resistive wire 35. Wire 35 is configured to receive an electrical current from a current source 350, which in one example includes a system battery, such as energy storage device 150 of FIG. 1. However in other examples, the oil sensing circuit may have a dedicated current source. A reference voltage 310 of the current source may be known, such as based on the voltage rating of the battery supplying power to the resistive wire. The circuit measures an actual voltage over the resistor, herein the resistive wire 35 relative to the reference voltage 310. A fixed current is fed to the resistive wire 35 from the current source 350, and the resistance of resistive wire 35 changes depending on how much oil is covering it and how long the current has been fed to the wire. The resistance is sensed via a voltage measurement. This determines a voltage slope, as shown at FIG. 6. In the depicted case, the lower the engine oil level in the oil well, the less the oil on the sensor, resulting in a more steep slope. Likewise, the higher the oil level in the oil well, the higher the oil level on the oil sensor, resulting in a more gradual slope. When the fixed current is applied to wire 35, heat is generated which affects the resistance of the wire. Since the heating of the wire is affected by how much of the wire is covered by the oil (that is, the engine oil level), a transfer function may be used to relate the sensed resistance of the wire (via the sensed voltage) and the oil level. The sensor signal from resistive wire 35 is returned to the output port 308 of the controller, or powertrain control module 312. A signal filter 304 and an analog to digital converter 306 is used to determine the voltage difference, and the slope, which is then used to infer the oil level.

In this way, the components of FIGS. 1-3 enable a system for a vehicle comprising an engine with an oil well; a vehicle speed sensor; an engine speed sensor; a lateral vehicle acceleration and a longitudinal vehicle acceleration sensor; an oil level sensor at least partially immersed in the oil well, the oil level sensor including a resistive wire coupled to an electrical circuit; and a controller with computer readable instructions stored on non-transitory memory that when executed, cause the controller to: while the vehicle is moving, and responsive to vehicle acceleration parameters being indicative of steady-state vehicle motion along a substantially straight line, sample oil level sensor output at defined time intervals; infer engine oil level based on a rate of change in sensor output over the defined time intervals; and adjust engine operation responsive to a lower than threshold engine oil level. The controller may include further instructions to infer the steady-state vehicle motion along a substantially straight line responsive to engine speed below a threshold engine speed, vehicle speed being a threshold vehicle speed, and lateral and longitudinal vehicle acceleration being within a corresponding threshold range. Additionally or optionally, sampling the oil level sensor at defined intervals may include applying a current to the resistive wire via the electrical circuit and measuring a voltage of the electrical circuit at the defined intervals. The controller may include further instructions to cycle the oil level sensor between an on-state and an off-state at a defined frequency; and sample the oil level sensor output at the defined time intervals while the oil level sensor is in the on-state. Additionally or optionally, where the vehicle is a hybrid vehicle further comprising an electric motor, the vehicle moving includes the vehicle being propelled via engine torque, and the controller includes further instructions to apply a first transfer function to estimate the engine oil level from the rate of change of sensor output when the vehicle is propelled via engine torque, the first transfer function distinct from each of a second transfer function used to estimate the engine oil level from oil level sensor output when the vehicle is stationary, and a third transfer function used to estimate the engine oil level from oil level sensor output when the vehicle is moving, propelled via motor torque from the electric motor.

Figure 4:
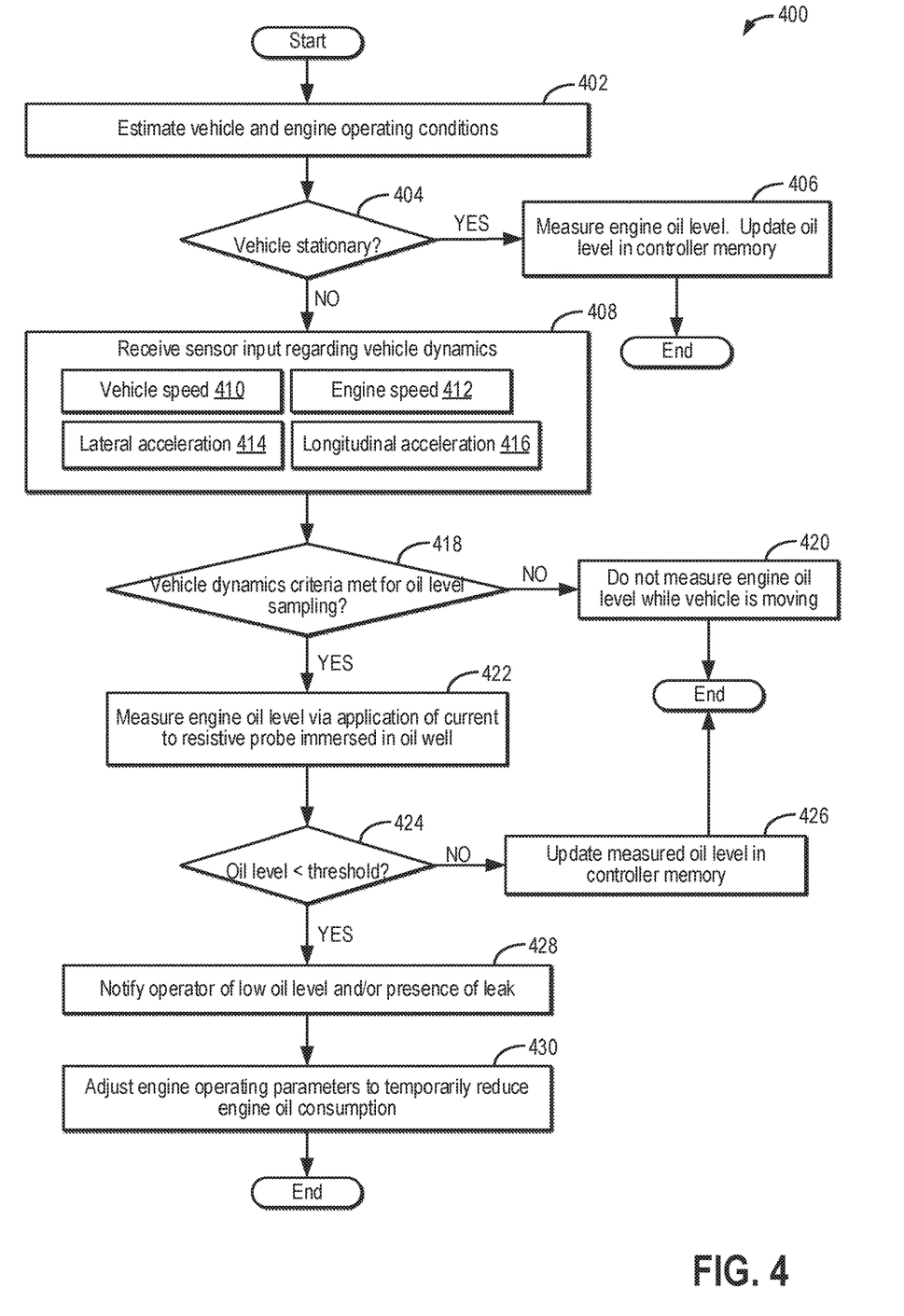
FIG. 4 shows a flow chart of an example method for dynamically estimating engine oil level during vehicle operation.

Turning now to FIG. 4, an example method 400 is shown for estimating an engine oil level via a hot wire sensor during selected vehicle operating conditions. The method enables engine oil level sensing to be accurately and frequently performed even while a vehicle is in motion. As a result, low engine oil levels can be detected earlier than in previous oil level sensing systems and addressed in a timely manner. Instructions for carrying out method 400 and the rest of the methods included herein may be executed by a controller based on instructions stored on a memory of the controller and in conjunction with signals received from sensors of the engine system, such as the sensors described above with reference to FIGS. 1-2. The controller may employ engine actuators of the engine system to adjust engine operation, according to the methods described below.

At 402, the method includes estimating vehicle and/or engine operating conditions. These include, for example, engine speed, vehicle speed, engine temperature, ambient conditions (e.g., ambient temperature, pressure, and humidity), boost pressure, manifold flow and pressure, engine dilution, etc. At 404, it is determined if the vehicle is stationary. For example, it may be confirmed if the vehicle speed is 0 and the vehicle is not moving. Alternatively, it may be determined if the vehicle speed is less than a threshold speed (such as less than 5 mph) and the vehicle is decelerating to a complete stop. If the vehicle is stationary, then at 406, the method includes measuring the engine oil level while the vehicle is stationary and updating the oil level in the controller's memory based on the measurement. The method then ends.

While the vehicle is stationary, a different set of criteria need to be used to determine when to measure oil level. First and foremost the vehicle needs to be in a relatively level state so as to not provide a false reading. The accelerometers of the vehicle can be used to measure the vehicle's stationary tilt to ensure that the tilt is lower than a threshold level. Next the vehicle control system will have different calibration tables for oil level when engine is off versus on to compensate for the oil being trapped in the engine head(s) and other parts of the engine lubrication circuit.

Oil level sensing during vehicle stationary conditions may include applying a current to the hot wire when the vehicle is stationary, and while the criteria for oil level sensing is met. The oil level sensor data is then converted to an oil level measurement via application of a transfer function, as shown with reference to FIG. 7. In particular, the transfer function applied during the stationary condition oil measurement may be different from the transfer function applied during the moving condition oil measurement. Thus, in one example, responsive to a qualifying vehicle stationary condition being met, the controller may apply a current to the sensor, while it is cycled on, at two different time points with an intermediate delay. The voltage measured during both tie points is then used to estimate a rate of change in voltage, and a corresponding rate of change in sensor temperature (due to heating of the wire element via passage of electric current there-through). Then, a first stationary condition based transfer function is applied to the learned rate of change, or slope. In comparison, as elaborated below, responsive to a qualifying vehicle moving condition being met, the controller may apply the same current to the sensor, while it is cycled on, at two different time points with an intermediate delay. The voltage measured during both tie points is then used to estimate another rate of change in voltage, and a corresponding rate of change in sensor temperature (due to heating of the wire element via passage of electric current there-through). Then, a second moving stationary condition based transfer function is applied to the learned rate of change, or slope. In one example, as shown in FIG. 7, the transfer function for the stationary condition may have a higher gain than the transfer function for the moving condition. Further, the transfer function for the stationary and moving conditions may be adjusted as a function of engine oil temperature. As such, when the vehicle is stationary, the output of the oil level sensor is reliable as the sensor is not subject to errors due to oil slosh, vehicle movement on an incline or decline, etc. However, due to a vehicle stationary condition occurring infrequently during a drive cycle, by the time a low oil level is sensed via the sensor during a vehicle stationary condition, there may be significant and irreversible engine degradation from insufficient oil levels. Accordingly, it may be desirable to be able to measure engine oil levels more reliably while the vehicle is in motion.

If the vehicle is not stationary, that is, the vehicle is moving at higher than a threshold speed (such as above 5 mph), then at 408, the method includes receiving input from a plurality of vehicle sensors, the input indicative of various vehicle dynamics' parameters. These include, as non-limiting examples, input regarding vehicle speed 410 from a vehicle speed sensor, input regarding engine speed 412 from an engine speed sensor, vehicle lateral acceleration 414 and longitudinal acceleration 416 from corresponding sensors. For example, vehicle tilt, yaw, and other motion sensors may be relied on to estimate the lateral and longitudinal acceleration. Further still, the vehicle dynamics' parameters may be inferred from other vehicle operating conditions, as well as from navigational input. For example, where the vehicle includes a GPS or other navigational device, input regarding vehicle speed, as well as lateral or longitudinal acceleration may be inferred from navigational input (such as based on a degree of incline/decline of the track on which the vehicle is travelling, the speed and direction of any headwinds/tailwinds/side-winds, etc.).

At 418, the method includes confirming if vehicle dynamics criteria have been met for enabling oil level sampling. For example, it may be confirmed based on the vehicle dynamics parameters assessed at 416, whether the vehicle is operating at steady-state and being driven in a substantially straight line. As an example, the criteria may be confirmed if the lateral and longitudinal acceleration input is relied on to determine that the vehicle is being driven at substantially constant vehicle speed in a straight line with no significant acceleration or deceleration. If the sampling criteria are not met, then at 420, the method includes not measuring the engine oil level while the vehicle is moving. The method then exits. In particular, if the vehicle is undergoing a transient (e.g., acceleration or deceleration), or if the vehicle is undergoing driving maneuvers (such as turns or swerves), then the oil in the oil pan may be getting thrown to one side.

If the oil level is sensed at this time via the sensor, there may be false level reading. For the example, if the sensor is immersed in the oil pan on side to which oil is being thrown to, the sensed oil level may be higher than actually present. On the other hand, if the sensor is immersed in the oil pan on the opposite side to the side where oil is being thrown to, the sensed oil level may be lower than actually present. Further, the natural slopes and grades of the road on which the vehicle is traveling can throw off the oil level measurement in a similar manner. By disabling oil level sensing during such conditions, and limiting the sensing to selected vehicle conditions, the oil level can be reliably and accurately sensed during vehicle motion. An example of oil level measurement criteria being met is described in the example of FIG. 5.

Returning to 418, if the sampling criteria are met, then at 422, the method includes measuring the engine oil level via application of an electrical current to the resistive probe immersed in the oil well/pan, herein also referred to as hot-wire method of engine oil level sensing. In particular, the oil level sensor may be set to cycle on for a first amount of time, followed by cycling off for a second, different amount of time, the second amount of time longer than the first amount of time. During the time that the sensor is cycled on, there is a change in temperature of the sensing wire which causes a change in resistance across the sensing circuit and results in a change in the voltage measured. Two calibrated points may be selected during the cycle on duration and the temperature rise over those two calibrated points may be used to estimate a temperature slope. This temperature is then correlated with engine oil level. In one example, the oil level sensor is cycled on for 200 ms and then cycled off for 800 ms. The cycle is then repeated. An example of oil level measurement via used of a hot-wire method is described in the example of FIG. 6. A transfer function created via the measurement is shown at FIG. 7.

At 424, after measuring the engine oil level via the hot-wire method, it may be determined if the engine oil level is below a threshold, such as less than 1.5 quarts below the nominal service fill. Still other thresholds may be selected based on engine oil capacity and design requirements of the vehicle. If the engine oil level is not below the threshold, then at 426, the measured oil level is updated in the controller's memory. On the other hand, if the measured engine oil level is below the threshold level, then at 428, the controller may notify the operator of low oil levels and/or the presence of a leak. In one example, low oil levels due to the presence of a leak may be distinguished from low oil levels due to oil consumption based on a rate of decrease in the sensed oil level during the vehicle moving condition. For example, large losses over a short amount of time (that is, a higher than threshold rate of decrease in sensed engine oil level) may indicate the presence of leaks while slight decreases (that is, a lower than threshold rate of decrease in sensed engine oil level) may indicate oil consumption.

At 430, responsive to the indication of low engine oil level, one or more engine and vehicle operating parameters may be adjusted to temporarily reduce engine oil consumption. For example, engine output torque may be limited by limiting boosted engine operation. In addition to engine performance limiting actions, a warning message can be sent to the customer to indicate a leak or the need to top up the oil level prior to invasive controls action. The method the ends.

While the method of FIG. 4 describes engine oil level sensing performed while an engine is operating (and providing torque to propel the vehicle) and the vehicle is moving or while the vehicle is stationary, it will be appreciated that in still further examples, the engine oil level sensing may be performed for a hybrid vehicle wherein the vehicle is moving with the engine disabled and the vehicle being propelled using motor torque only. In such a case, oil level sensing during an electric mode vehicle moving condition may include cycling the sensor, and applying a current to the hot wire, while it is cycled on, at two different time points with an intermediate delay. The voltage measured during both time points is then used to estimate a rate of change in voltage, and a corresponding rate of change in sensor temperature (due to heating of the wire element via passage of electric current there-through). Then, a third moving condition based transfer function is applied to the learned rate of change, or slope. The third transfer function applied during the electric mode may be different from the first stationary transfer function and the second moving condition transfer function applied when the engine is operating (and therefore while the engine oil is warm). In one example, the transfer function for the electric moving condition may be closer to (or the same as) the transfer function for the engine mode moving condition. Further still, the third transfer function may be adjusted to be calibrated between the first and second transfer function based on engine oil temperature at the time of the sensing, the transfer function calibrated further towards the engine mode moving condition transfer function as the oil temperature increases.

Turning now to FIG. 5, map 500 depicts example oil measurement signals captured over a drive cycle when selected vehicle driving conditions are met. In particular, the map depicts oil level sensing via a hot-wire method when vehicle dynamics parameters over a given drive cycle are indicative of conditions where the vehicle is in steady-state and traveling in a straight line. Map 500 depicts vehicle lateral acceleration of the vehicle (that is, movement from side-to-side) at plot 510 and longitudinal acceleration of the vehicle (that is, movement up and down or "pitch") at plot 508. Upper and lower bounds for lateral acceleration of the vehicle are shown by lines 502 and 504, respectively. In the depicted example, the upper and lower bounds for longitudinal acceleration of the vehicle overlap with those for lateral acceleration and are also shown by lines 502 and 504 However, in other examples, longitudinal and lateral acceleration may have distinct upper and lower bounds. Plot 506 depicts the operation of the oil level sensor. As can be seen, the sensor cycles between an on and an off-setting, where the is sensor turned on for a defined shorter duration, and then turned off for a defined longer duration. Multiple cycles are shown and one such cycle is indicated at 520. Readings sampled while the sensor is turned on are shown by filled circles 505. All plots are shown over time of vehicle operation on a drive cycle, along the x-axis. Herein the drive cycle refers to all engine and vehicle events occurring from a time a vehicle is keyed-on to a time the vehicle is keyed-off, the vehicle propelled for at least a part of the time between the key-on event and the key-off event.

As shown, samples 505 are collected only during conditions when both the lateral and the longitudinal acceleration are within bounds 502, 504. As such, multiple samples 505 are collected over the course of a given drive cycle while the vehicle is moving. Responsive to either of the accelerations being outside of the defined bounds, such as at time points marked by arrows 507, no samples are collected. When conditions are met, during the cycle on state of the oil sensor, two sensor data samples are collected, as indicated by the filled circles. The two sensor data samples are collected via the oil sensor on each given qualifying sample 505 while the oil sensor is cycling on. As elaborated at FIG. 6, a slope of voltage rise, and the correlated temperature rise between the two sampled points collected on one such cycle (such as cycle 520), is used to infer engine oil level, via application of a transfer function, such as the transfer function of FIG. 7.

Turning now to FIG. 6, map 600 depicts an example of data capture by an oil level sensor in accordance with the approach of FIG. 4 and FIG. 5. In particular, map 600 zooms into one of the plurality of oil sensor cycles of map 500, such as cycle 520 of FIG. 5. Map 600 depicts the oil sensor cycling at plot 602. In particular, the plot shows the sensor cycling between an on state and an off state. In the depicted example, the sensor may be cycled on for 200 ms and then cycled off for 800 ms before being cycled on again. Plot 604 shows a change in voltage measured at the oil level sensor, such as via the circuit of FIG. 3. Between t1 and t2, while the sensor is on, sensor data is collected at two points (represented by solid circles) while vehicle lateral and longitudinal acceleration is within upper and lower bounds. The data collected at the two time points, v1 and v2, include voltage measurements. Voltage is measured and then temperatures T1 and T2 are inferred from those voltage reading. Then, a rise in voltage over the two time points is measured as a function of the difference $\Delta v = v2 - v1$. A rate of the rise in temperature is inferred based on $\Delta v/\Delta t$. The rate of rise is then used to infer the engine oil level, such as via a transfer function. Example transfer functions are shown with reference to FIG. 7.

Map 700 compares an engine oil level measured via a hot wire during static conditions, when the vehicle is stationary (plot 702, dashed line), to engine oil level measured via the hot wire during dynamic conditions, when the vehicle is moving (plot 704, solid line). By recording the slope between the two points v1 and v2 and then averaging that with "x" number of repeated samples a transfer function can be created (as seen in FIG. 7.) and that average slope value can then be used to estimate the amount of oil in the engine. In this way, sensor data indicative of parameters relating to vehicle dynamics, such as vehicle speed and acceleration, can be used to identify moving vehicle conditions where engine oil level can be reliably sensed. By sampling the engine oil level only when the parameters are indicative of steady-state vehicle motion along a substantially straight path, an engine oil level sensor can be sampled more frequently during vehicle motion without corrupting sensor data. As a result, the robustness and reliability of oil level sensing is improved. By increasing the frequency of engine oil level measurement during vehicle motion, low oil levels and oil leaks can be identified and mitigated earlier in a drive cycle. This reduces the risk of engine degradation due to low oil levels.

One example method comprises: sampling an oil level sensor at selected intervals during vehicle motion based at least on lateral and/or longitudinal vehicle acceleration; and estimating engine oil level based on the sampling. In the preceding example, additionally or optionally, the sampling based at least on lateral and/or longitudinal vehicle acceleration includes sampling while lateral and/or longitudinal acceleration are indicative of steady-state vehicle motion along a substantially straight path of motion. In any or all of the preceding examples, additionally or optionally, the targeted time intervals are further based on vehicle speed and engine speed. In any or all of the preceding examples, additionally or optionally, the oil level sensor is a hot wire liquid level sensor at least partially immersed in an engine oil well. In any or all of the preceding examples, additionally or optionally, sampling the oil level sensor includes applying a current to an electrical circuit of the hot wire liquid level sensor and measuring a voltage of the electrical circuit. In any or all of the preceding examples, additionally or optionally, the estimating based on the sampling includes learning a rate of change of sensor output over a duration defined by the targeted time intervals; and applying a transfer function to estimate the engine oil level from the learned rate of change of sensor output. In any or all of the preceding examples, additionally or optionally, the transfer function used to estimate the engine oil level from sensor output during vehicle motion is different from the transfer function used to estimate the engine oil level from sensor output during a static vehicle condition. In any or all of the preceding examples, additionally or optionally, the sampling includes sampling while the oil level sensor cycles between an on-state and an off-state. In any or all of the preceding examples, additionally or optionally, the oil level sensor is sampled at the targeted time intervals while the oil level sensor is in the on-state.

Another example method for a vehicle comprises: during a vehicle moving condition, estimating engine oil level based on oil level sensor output sampled a plurality of times over a drive cycle and a first transfer function, the time intervals selected based on vehicle acceleration parameters; and during a vehicle stationary condition, estimating engine oil level based on oil level sensor output and a second transfer function. In any or all of the preceding examples, additionally or optionally, the vehicle acceleration parameters includes one or more or each of lateral vehicle acceleration, longitudinal vehicle acceleration, vehicle speed, and engine speed. In any or all of the preceding examples, additionally or optionally, at the selected time intervals, the vehicle acceleration parameters are indicative of steady-state vehicle motion along a substantially straight path of motion, the parameters including lateral and longitudinal acceleration being within respective upper and lower bounds. In any or all of the preceding examples, additionally or optionally, the method further comprises, during both the vehicle moving condition and the vehicle stationary condition, responsive to a lower than threshold engine oil level, adjusting one or more engine operating parameters to reduce engine oil consumption. In any or all of the preceding examples, additionally or optionally, the engine oil level sensor is continuously cycled between an on state and an off state, and wherein during the vehicle moving condition, the engine oil level sensor output is sampled the plurality of times over the drive cycle while the sensor is in the on state. In any or all of the preceding examples, additionally or optionally, the estimating during the vehicle moving condition includes sampling a first output of the oil level sensor at a first time during the drive cycle while the sensor is in the on state; sampling a second output of the oil level sensor at a second time during the drive cycle while the sensor is in the on state; estimating a change of sensor output over an interval between the first time and second time of sampling; inferring a slope for engine oil temperature rise based on the estimated change in sensor output over the interval; and applying the first transfer function to estimate the engine oil level from an average slope for engine oil temperature, the average slope averaged after a threshold iterations of the sampling.

An example system for a vehicle comprises: an engine with an oil well; a vehicle speed sensor; an engine speed sensor; a lateral vehicle acceleration and a longitudinal vehicle acceleration sensor; an oil level sensor at least partially immersed in the oil well, the oil level sensor including a resistive wire coupled to an electrical circuit; and a controller with computer readable instructions stored on non-transitory memory that when executed, cause the controller to: while the vehicle is moving, and responsive to vehicle acceleration parameters being indicative of steady-state vehicle motion along a substantially straight line, sample oil level sensor output at defined time intervals; infer engine oil level based on a rate of change in sensor output over the defined time intervals; and adjust engine operation responsive to a lower than threshold engine oil level. In any or all of the preceding examples, additionally or optionally, the controller includes further instructions to infer the steady-state vehicle motion along a substantially straight line responsive to engine speed below a threshold engine speed, vehicle speed being a threshold vehicle speed, and lateral and longitudinal vehicle acceleration being within a corresponding threshold range. In any or all of the preceding examples, additionally or optionally, sampling the oil level sensor at defined intervals includes applying a current to the resistive wire via the electrical circuit and measuring a voltage of the electrical circuit at the defined intervals. In any or all of the preceding examples, additionally or optionally, the controller includes further instructions to cycle the oil level sensor between an on-state and an off-state at a defined frequency; and sample the oil level sensor output at the defined time intervals while the oil level sensor is in the on-state. In any or all of the preceding examples, additionally or optionally, the vehicle is a hybrid vehicle further comprising an electric motor, wherein the vehicle is moving includes the vehicle being propelled via engine torque controller includes further instructions to apply a first transfer function to estimate the engine oil level from the rate of change of sensor output when the vehicle is propelled via engine torque, the first transfer function distinct from each of a second transfer function used to estimate the engine oil level from oil level sensor output when the vehicle is stationary, and a third transfer function used to estimate the engine oil level from oil level sensor output when the vehicle is moving, propelled via motor torque from the electric motor.

In another representation, the vehicle is a hybrid vehicle or an autonomous vehicle.

Note that the example control and estimation routines included herein can be used with various engine and/or vehicle system configurations. The control methods and routines disclosed herein may be stored as executable instructions in non-transitory memory and may be carried out by the control system including the controller in combination with the various sensors, actuators, and other engine hardware. The specific routines described herein may represent one or more of any number of processing strategies such as event-driven, interrupt-driven, multi-tasking, multi-threading, and the like. As such, various actions, operations, and/or functions illustrated may be performed in the sequence illustrated, in parallel, or in some cases omitted. Likewise, the order of processing is not necessarily required to achieve the features and advantages of the example embodiments described herein, but is provided for ease of illustration and description. One or more of the illustrated actions, operations, and/or functions may be repeatedly performed depending on the particular strategy being used. Further, the described actions, operations, and/or functions may graphically represent code to be programmed into non-transitory memory of the computer readable storage medium in the engine control system, where the described actions are carried out by executing the instructions in a system including the various engine hardware components in combination with the electronic controller.

It will be appreciated that the configurations and routines disclosed herein are exemplary in nature, and that these specific embodiments are not to be considered in a limiting sense, because numerous variations are possible. For example, the above technology can be applied to V-6, I-4, I-6, V-12, opposed 4, and other engine types. The subject matter of the present disclosure includes all novel and non-obvious combinations and sub-combinations of the various systems and configurations, and other features, functions, and/or properties disclosed herein.

As used herein, the term "approximately" is construed to mean plus or minus five percent of the range unless otherwise specified.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. A method, comprising:
sampling an oil level sensor at selected time intervals during vehicle motion based at least on lateral and/or longitudinal vehicle acceleration; and
estimating engine oil level based on the sampling.

2. The method of claim 1, wherein the sampling based at least on lateral and/or longitudinal vehicle acceleration includes sampling while lateral and longitudinal acceleration are indicative of steady-state vehicle motion along a substantially straight path of motion.

3. The method of claim 2, wherein the targeted time intervals are further based on vehicle speed and engine speed.

4. The method of claim 1, wherein the oil level sensor is a hot wire liquid level sensor at least partially immersed in an engine oil well.

5. The method of claim 4, wherein sampling the oil level sensor includes applying a current to an electrical circuit of the hot wire liquid level sensor and measuring a voltage of the electrical circuit.

6. The method of claim 1, wherein the estimating based on the sampling includes:
learning a rate of change of sensor output over a duration defined by the targeted time intervals; and
applying a transfer function to estimate the engine oil level from the learned rate of change of sensor output.

7. The method of claim 6, wherein the transfer function used to estimate the engine oil level from sensor output during vehicle motion is different from a transfer function used to estimate the engine oil level from sensor output during a static vehicle condition.

8. The method of claim 1, wherein the sampling includes sampling while the oil level sensor cycles between an on-state and an off-state.

9. The method of claim 8, wherein the oil level sensor is sampled at the targeted time intervals while the oil level sensor is in the on-state.

10. A method for a vehicle, comprising:
during a vehicle moving condition, estimating engine oil level based on oil level sensor output sampled a plurality of times over a drive cycle and a first transfer function, the time intervals selected based on vehicle acceleration parameters; and
during a vehicle stationary condition, estimating engine oil level based on oil level sensor output and a second transfer function.

11. The method of claim 10, wherein the vehicle acceleration parameters includes one or more or each of lateral vehicle acceleration, longitudinal vehicle acceleration, vehicle speed, and engine speed.

12. The method of claim 10, wherein at the selected time intervals, the vehicle acceleration parameters are indicative of steady-state vehicle motion along a substantially straight path of motion, the parameters including lateral and longitudinal acceleration being within respective upper and lower bounds.

13. The method of claim 10, further comprising, during both the vehicle moving condition and the vehicle stationary condition, responsive to a lower than threshold engine oil level, adjusting one or more engine operating parameters to reduce engine oil consumption.

14. The method of claim 10, wherein the engine oil level sensor is continuously cycled between an on state and an off state, and wherein during the vehicle moving condition, the engine oil level sensor output is sampled the plurality of times over the drive cycle while the sensor is in the on state.

15. The method of claim 14, wherein the estimating during the vehicle moving condition includes:
sampling a first output of the oil level sensor at a first time during the drive cycle while the sensor is in the on state;
sampling a second output of the oil level sensor at a second time during the drive cycle while the sensor is in the on state;
estimating a change of sensor output over an interval between the first time and second time of sampling;
inferring a slope for engine oil temperature rise based on the estimated change in sensor output over the interval; and
applying the first transfer function to estimate the engine oil level from an average slope for engine oil temperature, the average slope averaged after a threshold iterations of the sampling.

16. A system for a vehicle, comprising
an engine with an oil well;
a vehicle speed sensor;
an engine speed sensor;
a lateral vehicle acceleration and a longitudinal vehicle acceleration sensor;
an oil level sensor at least partially immersed in the oil well, the oil level sensor including a resistive wire coupled to an electrical circuit; and
a controller with computer readable instructions stored on non-transitory memory that when executed, cause the controller to:
while the vehicle is moving, and responsive to vehicle acceleration parameters being indicative of steady-state vehicle motion along a substantially straight line,
sample oil level sensor output at defined time intervals;
infer engine oil level based on a rate of change in sensor output over the defined time intervals; and
adjust engine operation responsive to a lower than threshold engine oil level.

17. The system of claim 16, wherein the controller includes further instructions to:
infer the steady-state vehicle motion along a substantially straight line responsive to engine speed below a threshold engine speed, vehicle speed being a threshold vehicle speed, and lateral and longitudinal vehicle acceleration being within a corresponding threshold range.

18. The system of claim 16, wherein sampling the oil level sensor at defined intervals includes:
applying a current to the resistive wire via the electrical circuit and measuring a voltage of the electrical circuit at the defined intervals.

19. The system of claim 16, wherein the controller includes further instructions to:
cycle the oil level sensor between an on-state and an off-state at a defined frequency; and
sample the oil level sensor output at the defined time intervals while the oil level sensor is in the on-state.

20. The system of claim 16, wherein the vehicle is a hybrid vehicle further comprising an electric motor, wherein the vehicle is moving includes the vehicle being propelled via engine torque, and wherein the controller includes further instructions to:
apply a first transfer function to estimate the engine oil level from the rate of change of sensor output when the vehicle is propelled via engine torque, the first transfer function distinct from each of a second transfer function used to estimate the engine oil level from oil level sensor output when the vehicle is stationary and a third transfer function used to estimate the engine oil level from oil level sensor output when the vehicle is moving, propelled via motor torque from the electric motor.

* * * * *